United States Patent [19]

Mooney

[11] Patent Number: 4,618,886
[45] Date of Patent: Oct. 21, 1986

[54] SURVEILLANCE CAMERA MOUNT

[75] Inventor: Paul C. Mooney, Northbrook, Ill.

[73] Assignee: Quick-Set Incorporated, Northbrook, Ill.

[21] Appl. No.: 746,444

[22] Filed: Jun. 19, 1985

[51] Int. Cl.⁴ .............................................. H04N 5/225
[52] U.S. Cl. ...................................... 358/108; 358/229
[58] Field of Search ......................... 358/108, 229, 210

[56] References Cited

U.S. PATENT DOCUMENTS

| 1,898,185 | 2/1933 | Howell. | |
|---|---|---|---|
| 2,306,862 | 12/1942 | Bown. | |
| 2,516,069 | 7/1950 | Newhouse et al.. | |
| 3,164,838 | 1/1965 | Heinrich. | |
| 3,613,538 | 10/1971 | Horberg | 358/229 |
| 4,233,634 | 11/1980 | Adams | 358/229 |
| 4,414,576 | 11/1983 | Randmae | 358/229 |

FOREIGN PATENT DOCUMENTS 2075114B 9/1983 United Kingdom.

Primary Examiner—Howard W. Britton
Attorney, Agent, or Firm—Wood, Dalton, Phillips Mason & Rowe

[57] ABSTRACT

A support for a surveillance camera is disclosed comprising a plurality of interfitting molded parts. The support includes a base having two parts secured together forming a cooperative raceway about their periphery. A hollow body having a lower flange extending inwardly and rotatively captured in the raceway provides panning movement and supports a pair of tilt arms joined together by a platform. The platform is adapted to support a camera housing. A cable passageway is defined through the base interior and housing and through at least one tilt arm and the platform into the camera housing.

12 Claims, 5 Drawing Figures

U.S. Patent   Oct. 21, 1986   4,618,886
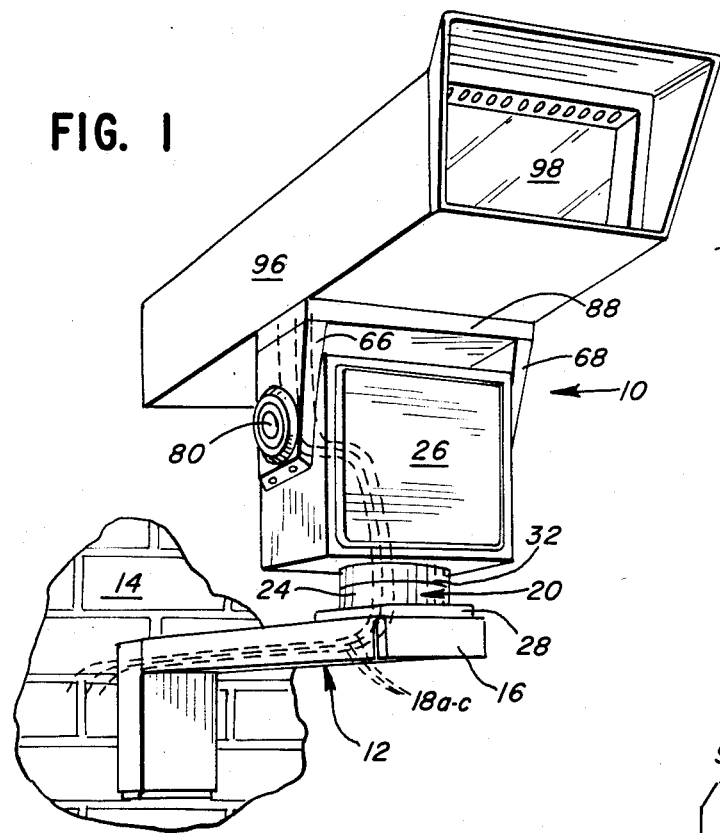
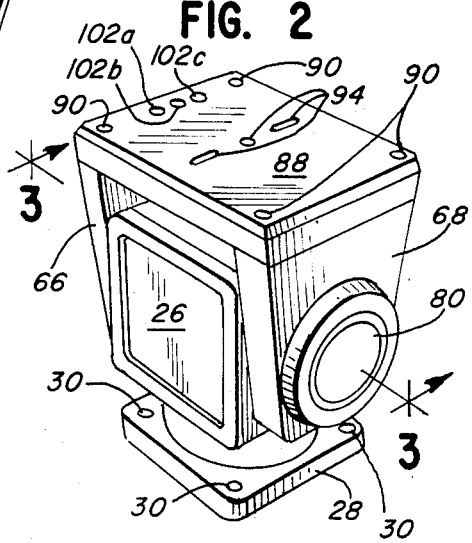
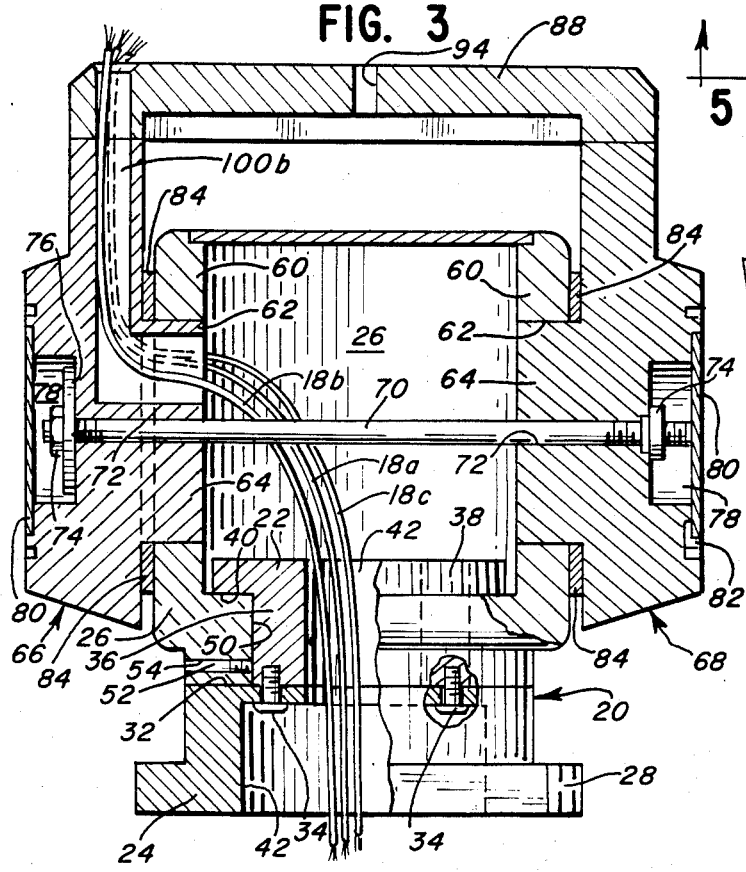
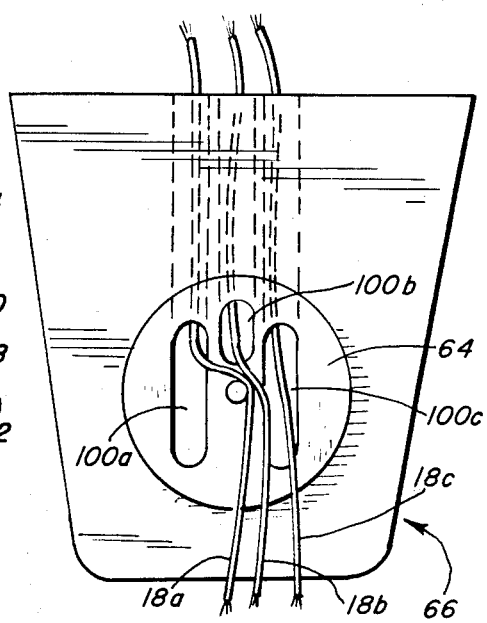

SURVEILLANCE CAMERA MOUNT

BACKGROUND OF THE INVENTION

1. Technical Field

The present invention relates to camera mounts and more particularly to camera mounts allowing for secure remote surveillance of a particular area.

2. Background Art

There is a need for a television camera support which is lightweight and steady in any position to which it is adjusted. In many installations, the camera may constantly be pointed at a particular reference which is desired to be monitored rather constantly, such as a vault door, an emergency exit, or a particularly important location within a security area. In such instances, a support is needed which can point the camera where wanted and hold it there indefinitely. Sometimes, it is also important to give the appearance of surveillance whether there is in fact a camera present or not.

One camera mount which has addressed some of the above needs is shown in my own UK Pat. GB No. 2075114 B.

SUMMARY OF THE INVENTION

In one aspect of the present invention, a support for a surveillance camera is disclosed comprising a plurality of interfitting molded parts. The support includes a base having two parts secured together forming a cooperative raceway about their periphery. A hollow body having a lower flange extending inwardly and rotatively captured in the raceway provides panning movement and supports a pair of tilt arms joined together by a platform. The platform is adapted to support a camera housing. A cable passageway is defined through the base interior and housing and through at least one tilt arm and the platform into the camera housing.

It is one object of the present invention to provide a lightweight support which may be easily installed in the desired location.

It is another object of the present invention to provide a camera mount which may be inexpensively manufactured, with both the parts and the assembly being low cost.

It is still another object of the present invention to provide a camera mount which may be simply and easily manipulated to point the camera at a particular location and which still further may be simply and easily secured in that position.

Yet another object of the present invention is to provide a camera mount which may be placed in a location without a camera while still providing a desired deterent effect.

BRIEF DESCRIPTION OF THE DRAWINGS

FIG. 1 is a perspective view of a camera mount embodying the present invention;

FIG. 2 is a perspective view of a camera mount embodying the present invention but excluding the camera housing;

FIG. 3 is a cross-sectional view taken along line 3—3 of FIG. 2;

FIG. 4 is a top view of one of the tilt arms of the present invention; and

FIG. 5 is a view taken along line 5—5 of FIG. 4.

DESCRIPTION OF THE PREFERRED EMBODIMENT

A camera mount 10 in accordance with the present invention is illustrated in FIG. 1. The mount includes an L-shaped support 12 which may be secured to a wall 14 to support an outwardly extending cantilevered portion 16. The cantilevered portion 16 defines an enclosed passage therethrough for camera cables 18a–c as further discussed hereafter.

A base 20 having an upper portion 22 and a lower portion 24 and adapted to rotatably support a unit housing 26 is secured to the support 12. Specifically, the lower base portion 24 has a flange 28 suitably secured to the support 12, as by bolts (not shown) through holes 30 (see FIG. 2) in the flange 28. The lower base portion 24 further has an upwardly facing bearing surface 32 to which the upper base portion 22 is suitably secured, as by the screws 34 shown in FIG. 3. The upper base portion 22 has a cylindrical portion 36 with an outwardly extending circular flange 38 on its upper end. The circular flange 38 has a bottom surface 40 which is substantially parallel to the bearing surface 32 of the lower base portion 24.

A passage 42 through both base portions 22,24 connects the passage in the cantilevered portion 16 to the interior of the unit housing 26.

The unit housing 26 is a box-like hollow body which is rotatably supported on the base 20 by an inwardly facing cylindrical bearing flange 50 on its bottom. The cylindrical bearing flange 50 is located in the raceway defined by the upper base portion cylindrical portion 36, the lower base portion bearing surface 32, and the upper base portion bottom surface 40. Assembly of this structure is easily accomplished by extending the cylindrical portion 36 of the upper base portion 22 through the housing flange 38 before securing the base portions 22,24 together.

Delrin has been found to be a suitable material for the base portions 22,24 ("Delrin" is the registered trademark of E. I. Du Pont de Nemours and Company for a synthetic resinous plastic material), since it provides a strong bearing surface with low frictional resistance and thereby requires no lubrication and has minimal wear.

As is apparent from the above description, the unit housing 26 may be pivoted in panning motion (i.e. about a vertical axis) to virtually any desired position. A set screw 52 is located in a threaded opening 54 extending radially from the cylindrical bearing flange 50 of the unit housing 26 and may be turned to engage the cylindrical portion 36 of the upper base portion 22 to secure the unit housing 26 in the desired position.

Two opposite side walls 60 of the unit housing 26 have aligned cylindrical openings 62 therethrough. Located within the cylindrical openings 62 are the cylindrical supports 64 of two upstanding tilt arms 66,68. A tie rod 70 extends through axial openings 72 in the tilt arms 66,68 and is suitably secured on both ends, as by the bolts 74 and washer 76 located in the recesses 78 shown in FIG. 3, to secure the arms 66,68 to the housing 26. Spun disks 80 are frictionally secured over the recesses 78 for aesthetic purposes and also to protect the ends of the tie rod 70. A suitable opening 82 is provided for, e.g., a screw driver, so that the disks 80 may be easily pried off when access to the tie rod 70 is necessary.

Friction washers 84 made of, for example, cork are located between the unit housing 26 and the tilt arms 66,68. Or molded serrations in abutting surfaces of housing 26 and tilt arms 66, 68 may be substituted for friction washers 84. By tightening the bolts 74 of the tie rod 70 to bias the tilt arms 66,68 together and against the friction washers 84, the tilt arms 66,68 can be frictionally held jiggle-free in any desired tilt position.

A table or platform 88 is secured to the upper ends of the tilt arms 66,68, as by screws (not shown) through openings 90,92 in the table 88 and arms 66,68 (see FIGS. 2 and 4). The table 88 further has suitable openings 94 therein for securing a suitable camera housing 96 thereto.

As shown in FIG. 1, the camera housing 96 encloses a camera (not shown), such as a remote control television surveillance camera, and has a window 98 through which the camera looks. As is apparent from the above discussion, the camera may be directed to view virtually any vista open to it by simply panning the unit housing 26 about the base 20 and tilting the camera housing 96 about the cylindrical arm supports 64.

Still further, as best illustrated in FIGS. 3-5, the camera cables 18a-c may be extended directly through the tilt arms 66,68 and into the camera housing 96 so that the cables 18a-c are completely protected from the outside environment. That is, one tilt arm 66 has three L-shaped channels 100a-c each having one end open to the interior of the unit housing 26 and the other end open at the top of the arm 66. The table 88 further has three openings 102a-c aligned with the arm channels 100a-c so that, when a camera housing 96 is suitably mounted thereon, the cables 18a-c (e.g. a power cable, control cable, and camera output signal cable) may be extended directly into the camera housing 96 without exposure to the outside environment. Preferably, the cables 18a-c should loosely fit in the passage 42 and openings 100a-c,102a-c and cable expansion lengths should be provided to permit panning and tilting motion without cable binding. This structure thus protects the cables not only from extreme weather and other environmental conditions, but also from damage from accidents or vandalism, thereby ensuring proper operation of the camera under virtually all conditions.

The camera mount 10 of the present invention additionally may be inexpensively made of molded plastic, though other materials would of course be suitable. Further, the camera mount 10 of the present invention may be simply and inexpensively assembled. Still further, this camera mount 10 can be easily placed in any desired position (e.g. for surveillance of bank vault door), and can further be simply secured in any such position.

The above described camera mount 10 also provides an attractive appearance without any loose cables, such appearance being extremely important in many uses, such as retail stores. The present invention still further allows for the mount to be inexpensively installed without a camera so that, even though providing no surveillance, it will still provide a desired deterrent (against, e.g. shoplifting).

Still other aspects, objects and advantages of the present invention can be obtained from a study of the drawings, the specification and the appended claims.

I claim:

1. A surveillance camera mount capable of providing multiple and variable selectable viewing vistas for a camera mounted thereon, comprising:

a base having mated lower and upper parts,
the lower part having a base flange with means for securing the lower part to a stationary member to secure the mount and a planar bearing surface across the top thereof generally parallel to the flange,
the base upper part having a vertical cylindrical body secured to the lower part centrally of said bearing surface so as to leave an annular bearing surface portion exposed about the body, and further having an outwardly extending flange generally parallel to and spaced from said bearing surface,
both base parts having walls defining a hollow central passage through the base from top to bottom;
a hollow housing of relatively box-like configuration having a lower, inwardly extending bearing flange engaging said base bearing surface, said bearing flange further having an upper surface in close proximity below said base upper part flange and a cylindrical surface closely mating with the cylindrical body of said base upper part to rotatively secure said housing to said base;
means defining enlarged openings through opposite sides of the housing, said openings being cylindrical and substantially aligned horizontally;
a pair of upstanding tilt arms, each arm having a bearing part entering and filling said housing enlarged openings and a body portion extending above the housing;
a platform secured to the arm body portions to provide unitary movement of arms and platform, said platform being adapted to support a camera housing thereon;
means forming cable passages through the platform and through the interior of at least one of said tilt arms and bearing parts exiting to the interior of the hollow housing so that camera cables may be lead through the mount to a camera housing on the platform;
means for holding said tilt arms in a selected position relative to said housing; and
means for securing said housing in a selected position relative to said base.

2. The camera mount of claim 1, wherein the holding means comprises:
rings of friction material interposed between said arms and hollow housing; and
a tie rod extending between said tilt arms through said bearing parts and the hollow housing for tightening said arms against the hollow housing and rings to frictionally bind said arms against undesired movement relative to the hollow housing.

3. The camera mount of claim 1, further comprising means secured to the hollow housing to selectively engage said base to lock said housing in a fixed position relative to said base.

4. The camera mount of claim 3, wherein said engaging means comprises a set screw.

5. The camera mount of claim 1, wherein said base, hollow housing, and tilt arms are formed of molded plastic.

6. The camera mount of claim 5, wherein said base is formed of Delrin.

7. A support for a surveillance television camera comprising a plurality of interfitting molded parts of plastic material including:
a base having two parts secured together forming a cooperative raceway about their periphery defined by a cylindrical upright surface bounded by spaced parallel surfaces extending radially from the upright surface;

a box-like hollow body having a lower flange extending inwardly and rotatively captured in said raceway to provide panning movement of the box relative to the base without camera sight interfering looseness;

a pair of tilt arms with bearing supports rotatively supporting the arms on opposite sides of the box-like body;

a platform joining the tilt arms above the box-like body and having an upper exposed surface;

a television camera housing secured to the platform surface;

means defining a cable passageway through the base into the hollow housing and through at least one tilt arm and the platform into the supported camera housing.

8. The support of claim 7, wherein each tilt arm has a central opening through its bearing support and further comprising:

friction material interposed between said arms and hollow body; and a tie rod secured through said arm openings to squeeze the arms against the hollow body and friction material to secure said platform in a selected tilt position.

9. The support of claim 7, further comprising means secured to the hollow body to selectively engage said base to lock said body in a fixed position relative to said base.

10. The support of claim 9, wherein said engaging means comprises a set screw.

11. The support of claim 7, wherein said base is formed of Delrin.

12. A television camera support for surveillance of any one of multiple viewing vistas, comprising:

a base having means for securing the same to a stationary member in a fixed position, said base having an upstanding portion for rotatively supporting a panning housing thereon and further having an upright cable passage therethrough;

a hollow housing having a lower wall bearing member associated rotatively with the upstanding portion of said base to permit panning movement of the housing relative to the base while holding the housing against vibration relative to the base when reposing in a single selected position;

a pair of upstanding tilt arms each having a lower end in bearing relation with a side of the housing and upper ends above the level of the housing;

platform means attached to the upper ends of said tilt arms for supporting a camera;

bearing means between said housing and arms allowing tilting movement of the platform and tilt arms together as a unit relative to the housing and jiggle-free support of a camera on said platform when stopped from tilting movement; and means forming cable passages from the housing through at least one tilt arm and the platform for extending the cable internally of the camera support through the base to the platform level.

* * * * *